M. J. O'MALLEY.
FIBROUS MATERIAL OF CONSTRUCTION.
APPLICATION FILED FEB. 1, 1917.
1,233,801. Patented July 17, 1917.
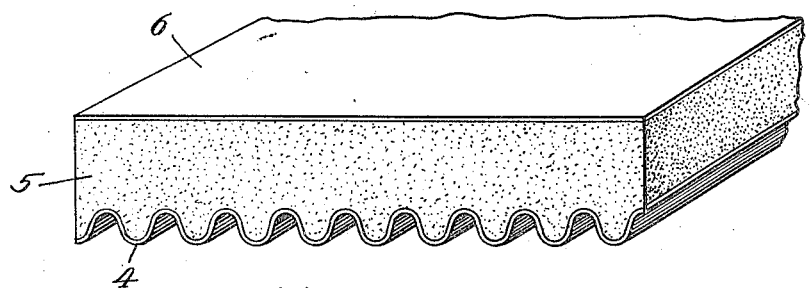
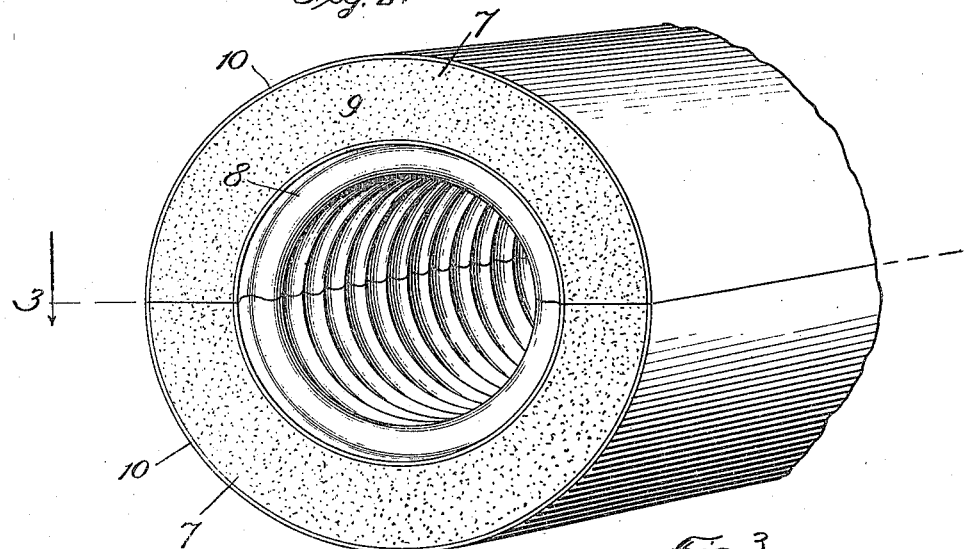
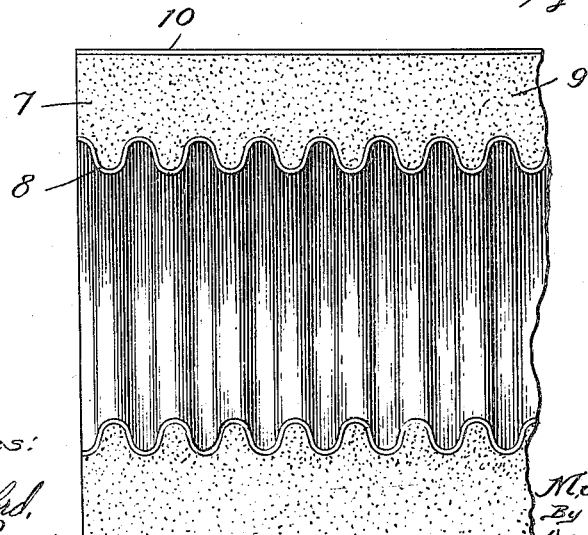
Inventor:
Michael J. O'Malley,

UNITED STATES PATENT OFFICE.

MICHAEL J. O'MALLEY, OF CHICAGO, ILLINOIS.

FIBROUS MATERIAL OF CONSTRUCTION.

1,233,801.

Specification of Letters Patent.   Patented July 17, 1917.

Application filed February 1, 1917. Serial No. 145,850.

*To all whom it may concern:*

Be it known that I, MICHAEL J. O'MALLEY, a citizen of the United States, residing at Chicago, in the county of Cook and State of Illinois, have invented a new and useful Improvement in Fibrous Material of Construction, of which the following is a specification.

My invention relates more particularly to the use of fibrous materials provided as insulators of heat and sound and more particularly to those involving the use of asbestos, such materials being commonly used for covering boilers, hot water and steam pipes and other conductors and conduits required to be insulated from a surrounding space.

Material commonly used for such purpose is sheet asbestos, which operates very desirably to effect insulation, but by reason of the fact that these sheets are made from long fiber asbestos, sheets of this character are relatively expensive, thus rendering very desirable the use of a substitute material where practically the same results may be obtained.

My primary object is to provide a construction material of the character above referred to which will operate in a satisfactory manner to produce the desired insulation from heat and sound, which shall be relatively inexpensive as compared with the use of asbestos sheets alone for the insulating purpose; and which may be transported in the usual ways, and handled, without danger of impairment as by the crumbling of the material.

Referring to the accompanying drawing:

Figure 1 is a broken perspective view of a block or slab of insulating material constructed in accordance with my invention.

Fig. 2 is a broken view of sectional tubular insulating material constructed in accordance with my invention; and Fig. 3 is a plan view of one of the similar sections forming the tube, the view being taken along the line 3 in Fig. 2 and viewed in the direction of the arrow.

In accordance with my invention the insulating covering material is composed of a sheet of fibrous material such as asbestos, and a backing of any suitable earthy material which possesses properties of insulation from heat and sound, such as a combination of asbestos fiber and a filler or binder of calcined gypsum or magnesia which is united with the sheet, the opposite face of the mass thus provided being preferably covered with a sheet of fibrous material such as asbestos. By so constructing a body of insulating material, it is possible to use as a body, relatively inexpensive material, such as the mixture of gypsum and asbestos hereinbefore referred to and which is formed in part, of short fiber asbestos which if used alone would under the heat and the handling incident to transportation and application thereof to use, crumble and thereby become impaired. By covering it at the surface thereof which in use lies against the heated surfaces, with a sheet of asbestos or other suitable fibrous covering, and particularly when it is interposed between two layers of sheets of fibrous material, it is protected against crumbling and remains unimpaired thus permitting insulating material having relatively great insulating properties, to be provided economically.

My invention presents its greatest advantage in connection with insulating material the inner surface of which, *i. e.* that surface which lies against the heated surface, is of corrugated formation which is recognized as very desirable inasmuch as the air cells between the insulating material and the heated surface with which it coöperates, these air cells being provided by the corrugations, serve to more effectually insulate than where the insulating material lies in flatwise contact against the heated surface. Where the insulating material is made from cast or molded earthy materials such as a combination of asbestos and calcined gypsum, or the like, without the use of a fibrous covering, it is practically impossible to form the desired corrugations on a face thereof. The material is of such a character that it will not readily mold to form continuous ribs as desired and furthermore the ribs, by reason of the low tensile strength of the material, are so weak and fragile that in the handling of the mass of insulating material, and when subjected to heat, it readily crumbles, thus impairing the corrugations. By employing a sheet of fibrous material such as asbestos, in corrugated form and providing the earthy material as a backing or a filler, the corrugated surfaces remain intact under normal handling, transportation and use. In Fig. 1 the sheet which forms that surface of the mass of insulating material shown which it is intended to be positioned adjacent the heated surface, as for example the walls of a boiler, is represented at 4, the mass of earthy material such as a combination of asbestos and calcined gypsum, at 5, and the backing of asbestos or the like material, at 6. The asbestos sheet 4 is shown in the preferred form i. e. corrugated and in practice this sheet may be formed into this shape in any suitable manner, preferably preliminary to the uniting of the same with the mass 5, and the latter then cast or molded against a face of the sheet 4 to conformingly fit the corrugations and become united with the sheet to form a practically integral mass, the sheet 6 then being applied against the upper surface of the mass 5 to unite therewith.

In Figs. 2 and 3 I have shown the same idea as applied to a sectional covering for pipes. In this case the sections are represented at 7 each being semi-cylindrical to adapt them to be applied to a pipe. The inner sheet of asbestos or the like is represented at 8, the backing or filling of a combination of asbestos and gypsum, or the like, at 9 and the outermost sheet of asbestos or the like at 10, the sheet 8 being corrugated as shown preferably to provide the circumferentially extending corrugations as shown.

By constructing insulating material in accordance with my invention I am enabled to produce blocks or masses of insulating material the major portions of which are formed of material presenting relatively great insulating properties, and which material may be obtained at relatively low cost, but which can not be satisfactorily used according to practices as hitherto known, and when used in accordance with my invention results in the production of insulating material having properties rendering it very desirable as a commercial article.

While I have illustrated my invention as embodied in certain forms of structure, I do not wish to be understood as intending to limit it thereto as it may be embodied in other forms, it being my intention to claim my invention as fully and completely as the prior state of the art will permit.

What I claim as new and desire to secure by Letters Patent is:—

1. Insulating material formed of a substantially rigid cast or molded mass of earthy material faced at the surface thereof to be subjected to heat in use, with a sheet of fibrous material.

2. Insulating material formed of a cast or molded mass of earthy material faced at the surface thereof to be subjected to heat in use, with a sheet of asbestos.

3. Insulating material formed of a cast or molded mass of earthy material faced at the surface thereof to be subjected to heat in use, with a sheet of corrugated fibrous material.

4. Insulating material formed of a cast or molded mass of earthy material faced at the surface thereof to be subjected to heat in use, with a corrugated sheet of asbestos.

5. Insulating material formed of a cast or molded mass of earthy material faced at opposite sides thereof with sheets of fibrous material.

6. Insulating material formed of a substantially rigid cast or molded mass of earthy material faced at opposite sides thereof with sheets of asbestos.

7. Insulating material formed of a cast or molded mass of earthy material faced at opposite sides thereof with sheets of asbestos, one of said sheets being corrugated.

8. Insulating material formed of a cast or molded mass of short fiber asbestos and a binder faced at opposite sides thereof with sheets of asbestos, one of said sheets being corrugated.

MICHAEL J. O'MALLEY.